(12) United States Patent
Suma et al.

(10) Patent No.: US 9,671,256 B2
(45) Date of Patent: Jun. 6, 2017

(54) PROXIMITY SENSOR

(71) Applicant: Panasonic Intellectual Property Management Co., Ltd., Osaka (JP)

(72) Inventors: Takashi Suma, Mie (JP); Yukinori Fujikawa, Mie (JP); Nozomu Sakurai, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/074,010

(22) Filed: Mar. 18, 2016

(65) Prior Publication Data
US 2016/0290836 A1    Oct. 6, 2016

(30) Foreign Application Priority Data

Mar. 30, 2015 (JP) ................ 2015-069259

(51) Int. Cl.
*G01K 1/14*    (2006.01)
*G01D 11/24*    (2006.01)

(52) U.S. Cl.
CPC ................ *G01D 11/245* (2013.01)

(58) Field of Classification Search
CPC ................ G01D 11/24; G01K 1/14
USPC ........................................... 73/431
See application file for complete search history.

(56) References Cited

U.S. PATENT DOCUMENTS

| | | | | |
|---|---|---|---|---|
| 5,016,343 A * | 5/1991 | Schutts | ........... | G01V 3/101 29/602.1 |
| 5,021,737 A * | 6/1991 | Schutts | ........... | G01V 3/101 324/207.11 |
| 5,278,496 A * | 1/1994 | Dickmeyer | ........... | G01P 3/488 174/353 |
| 5,351,388 A * | 10/1994 | Van Den Berg | ........... | G01H 1/003 264/272.15 |
| 5,392,654 A * | 2/1995 | Boyle | ........... | E21D 21/02 411/14 |
| 5,507,089 A * | 4/1996 | Dickmeyer | ........... | G01P 1/026 156/73.1 |
| 6,152,432 A * | 11/2000 | Perrin | ........... | F16F 9/06 188/276 |
| 6,643,909 B2 * | 11/2003 | Rose | ........... | G01B 7/003 264/272.13 |
| 2006/0037394 A1 * | 2/2006 | Shiffer | ........... | G01D 11/245 73/431 |

(Continued)

FOREIGN PATENT DOCUMENTS

JP    2010-027515    2/2010

*Primary Examiner* — Lisa Caputo
*Assistant Examiner* — Jamel Williams
(74) *Attorney, Agent, or Firm* — McDermott Will & Emery LLP

(57) ABSTRACT

A proximity sensor includes a body, a coil, a cap being cylindrical and having a bottom, a hollow housing, and a ring-shaped sealing member. The body includes the coil bobbin at a first end. The coil is wound around the coil bobbin. The cap is to be placed to a body so as to cover a coil bobbin. The housing includes, at a fist end, a circular-cylinder portion having an opening. The housing is to be placed to the body in such a manner that the cap protrudes from the opening. The sealing member is disposed between the outer peripheral surface of the cap and the inner peripheral surface of the circular-cylinder portion of the housing.

9 Claims, 8 Drawing Sheets

(56) References Cited

U.S. PATENT DOCUMENTS

2016/0084716 A1* 3/2016 Sun .......................... G01K 1/14
                                                              374/208

* cited by examiner

PROXIMITY SENSOR

BACKGROUND OF THE INVENTION

1. Technical Field

The present disclosure relates to a proximity sensor, and more particularly to a proximity sensor for sensing presence of an object made of metallic material, magnetic material, or the like, in a non-contact manner.

2. Background Art

Conventionally, a proximity sensor including a body unitarily molded with a coil bobbin around which a coil is wound, a housing to which the body is attached, and a circular-cylindrical cover disposed around the coil bobbin has been proposed (see, for example, PTL1).

In the proximity sensor described in PTL 1, the coil bobbin provided to the body is exposed to the outside from a lower end side of a circular-cylinder portion of the housing. A cover is attached to the lower end side of the circular-cylinder portion of the housing such that the cover is disposed around the coil bobbin. In this proximity sensor, a gap between an inner side surface of the cover and the coil bobbin is filled with sealing material, so that the cover and the coil bobbin are fixed to each other with the sealing material. Furthermore, the sealing material is filled between the inner-side surface of the circular-cylinder portion of the housing and the cover, so that the housing and the cover are fixed to each other with the sealing material.

CITATION LIST

Patent Literature

PTL 1: Japanese Patent Application Unexamined Publication No. 2010-27515

SUMMARY OF THE INVENTION

A proximity sensor includes a body, a coil, a cap being cylindrical and having a bottom, a hollow housing, and a ring-shaped sealing member. The body includes the coil bobbin at a first end. The coil is wound around the coil bobbin. The cap is to be placed to a body so as to cover a coil bobbin. The housing includes, at a fist end, a circular-cylinder portion having an opening. The housing is to be placed to the body in such a manner that the cap protrudes from the opening. The sealing member is disposed between the outer peripheral surface of the cap and the inner peripheral surface of the circular-cylinder portion of the housing.

DETAILED DESCRIPTION OF THE PREFERRED EMBODIMENT

Figure 1:
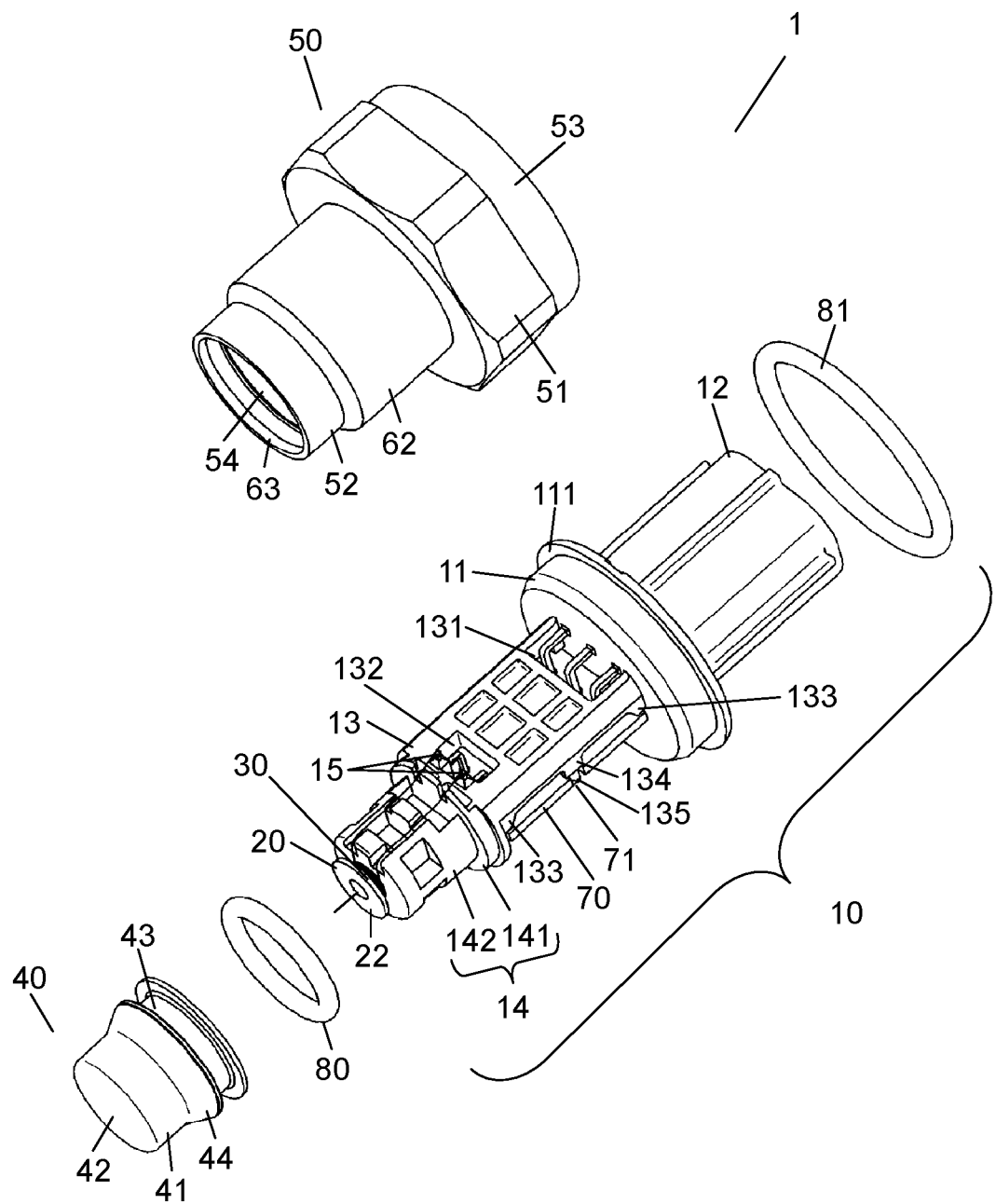
FIG. 1 is an exploded perspective view of a proximity sensor in accordance with an exemplary embodiment.

In a proximity sensor, a sensing area is changed depending on a position of a coil bobbin. Therefore, it is necessary to attach a coil bobbin to a housing with high accuracy so that the coil bobbin can be in a predetermined positional relation with respect to the housing. In a conventional proximity sensor, a cover to which a coil bobbin is fixed and a housing are fixed to each other with liquid curable sealing material. Therefore, the sealing material is required to be filled and solidified while the cover is kept in a predetermined position with respect to the housing. Accordingly, workability in assembly is bad. Hereinafter, a proximity sensor in accordance with this exemplary embodiment is described with reference to FIGS. 1 to 8. In the following description, based on upper, lower, left and right directions shown by arrows in FIG. 2, a direction perpendicular to both the upper-lower direction and the left-right direction is referred to as the front-back direction. However, the directions are defined for convenience of description, and therefore it is not intended to limit attachment directions of a proximity sensor to the above-mentioned directions. Note here that a below-described configuration is just an example of the present invention. The present invention is not necessarily limited to the exemplary embodiment mentioned below, and can be modified variously depending on designs and the like in the scope of the technical idea of the present invention.

The proximity sensor of this exemplary embodiment is attached to, for example, a transmission case of an automobile equipped with a manual transmission, and is used for detecting whether the manual transmission is switched to neutral. Note here that the proximity sensor of this exemplary embodiment is not necessarily limited to the above-mentioned application and may be used for any other various applications for sensing presence of an object made of metallic material, magnetic material, or the like, in a non-contact manner.

Proximity sensor 1 of this exemplary embodiment includes body 10, coil 30, cap 40 being cylindrical and having a bottom, hollow housing 50, and ring-shaped sealing member 80. Body 10 has coil bobbin 20 at a first end. Coil 30 is wound around coil bobbin 20. Cap 40 is to be placed to body 10 so as to cover coil bobbin 20. Housing 50 has circular-cylinder portion 52 having opening 63, at a first end, and is to be placed to body 10 in such a manner that cap 40 protrudes from opening 63. Sealing member 80 is to be placed between the outer peripheral surface of cap 40 and the inner peripheral surface of circular-cylinder portion 52 of housing 50. Sealing member 80 is, for example, an O-ring.

Hereinafter, proximity sensor 1 is described in detail. Body 10 is, for example, a molded product of insulating synthetic resin. As shown in FIGS. 1, 2, 6, and 7, body 10 includes flange portion 11, connector portion 12, substrate support portion 13, cap support portion 14, and coil bobbin 20. Furthermore, body 10 may include circuit board 70.

Flange portion 11 has a disk shape. Flange portion 11 has brim portion 111 in the upper part of the peripheral surface of flange portion 11. Brim portion 111 protrudes in the diameter direction of flange portion 11.

Connector portion 12 is provided on the upper surface of flange portion 11. Connector portion 12 includes three terminals 121 (a power supply terminal, a sense signal output terminal, and a common terminal), and plug-connection portion 123 (see, FIG. 3A).

In this exemplary embodiment, body 10 is molded in a state in which three terminals 121 are embedded in flange portion 11. A first end of each of three terminals 121 protrudes upward from the upper surface of flange portion 11. A second end of each of three terminals 121 is exposed from the lower surface of flange portion 11. Each of three terminals 121 exposed from the lower part of flange portion 11 is bent in an L-shape with the tip thereof protruding rightward (see FIG. 2). A region protruding rightward of each of three terminals 121 forms connection terminal 122 to be connected to circuit board 70. Plug-connection portion 123 has a cylindrical shape protruding upward from the surrounding of the region from which terminals 121 protrude on the upper surface of flange portion 11. When a plug of an external circuit (not shown) is connected to plug-connection portion 123, terminals 121 of connector portion 12 are electrically connected to terminals of the plug of the external circuit. Thus, electric power is supplied from the external circuit to a sensing circuit (not shown) formed on circuit board 70. As a result, the sensing circuit formed on circuit board 70 can output a sense signal to the external circuit.

Figure 2:
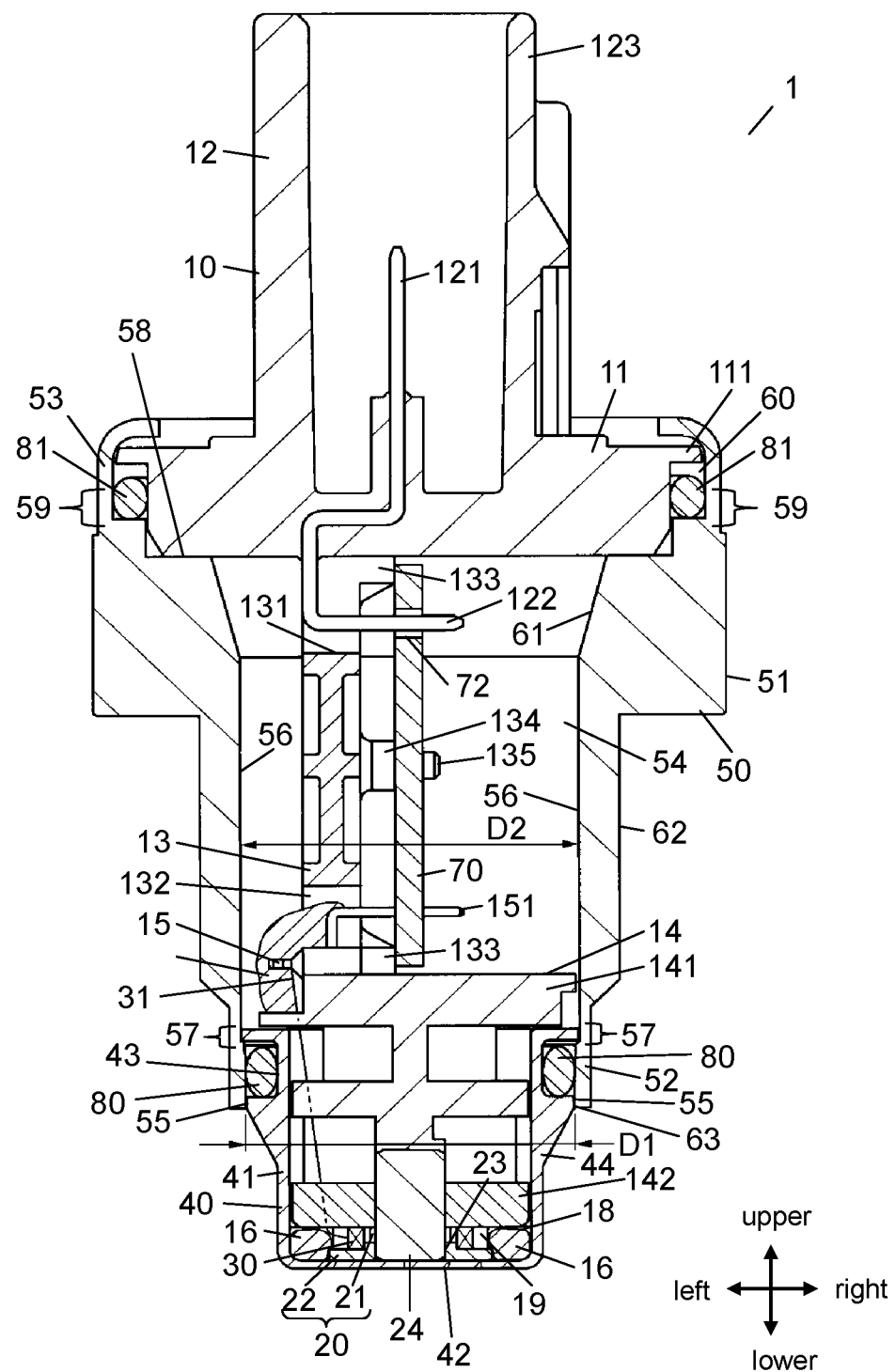
FIG. 2 is a sectional view of the proximity sensor in accordance with the exemplary embodiment.
Figure 3A:
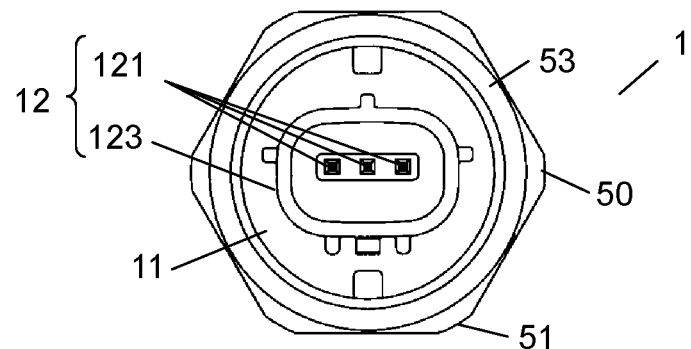
FIG. 3A is a top view of the proximity sensor in accordance with the exemplary embodiment.
Figure 3B:
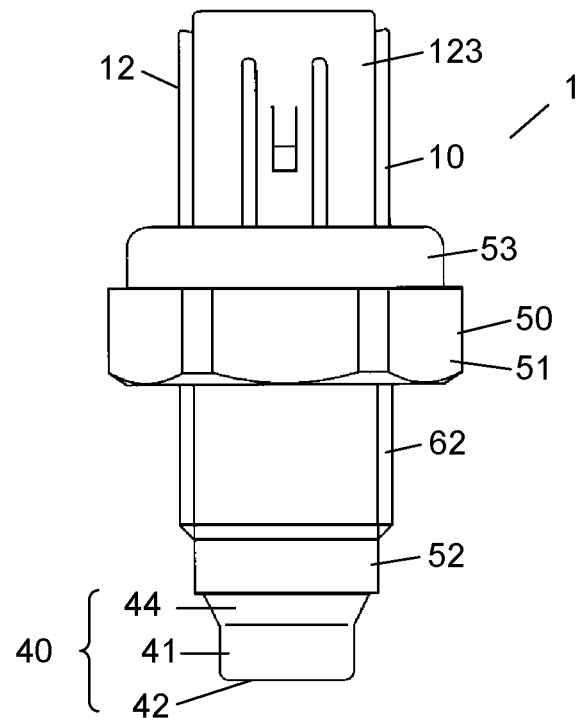
FIG. 3B is a side view of the proximity sensor in accordance with the exemplary embodiment.
Figure 3C:
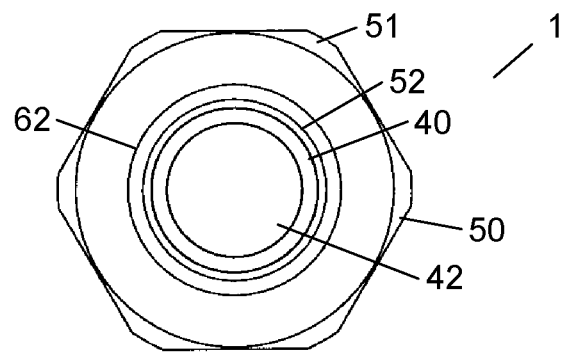
FIG. 3C is a bottom view of the proximity sensor in accordance with the exemplary embodiment.
Figure 4:
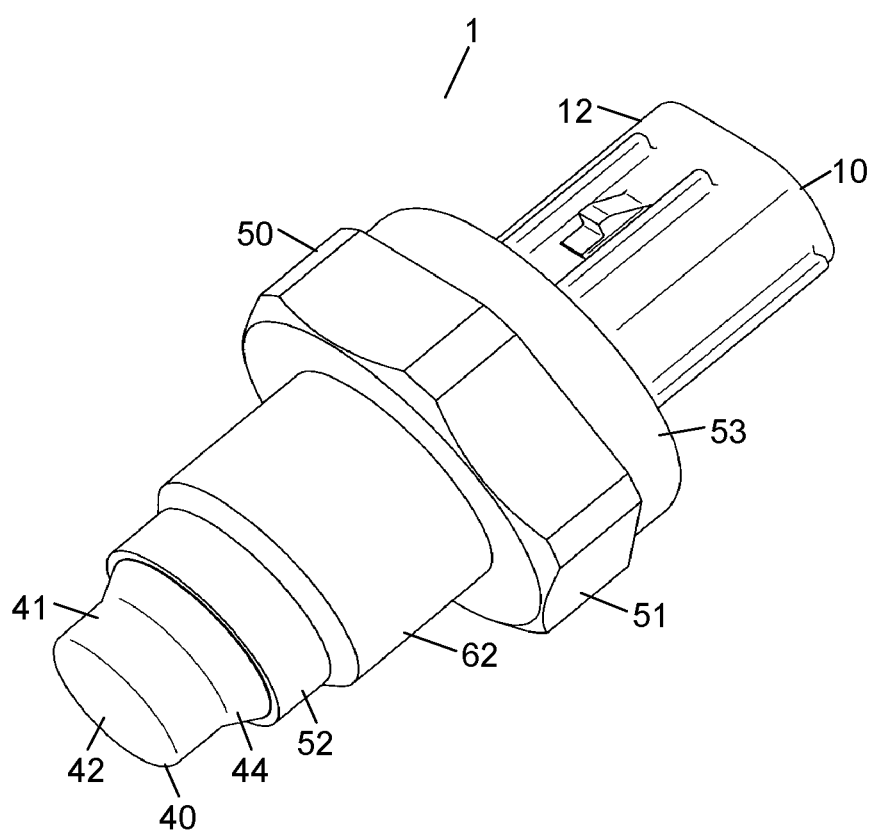
FIG. 4 is an external perspective view of the proximity sensor in accordance with the exemplary embodiment.

Substrate support portion 13 is formed in a rectangular plate shape protruding downward from the lower surface of flange portion 11. As shown in FIG. 2, substrate support portion 13 is provided in a position displaced from the central axis of circular-cylinder portion 52 and flange portion 11 so that circuit board 70 attached to substrate support portion 13 can be disposed in the central axis of circular-cylinder portion 52 of housing 50.

The upper part of substrate support portion 13 is provided with penetration-hole 131 penetrating in the thickness direction of substrate support portion 13. The lower part of substrate support portion 13 is also provided with penetration-hole 132 penetrating in the thickness direction of substrate support portion 13. Connection terminals 122 exposed from the lower surface of flange portion 11 protrude through penetration-hole 131 to the right side of substrate support portion 13, and are inserted into through-hole 72 of circuit board 70. In this exemplary embodiment, body 10 is molded in a state in which a pair of coil terminals 15 is embedded in the lower part of substrate support portion 13. A first end of each coil terminal 15 protrudes from the left side surface (a surface opposite to the surface to which circuit board 70 is attached) of substrate support portion 13. By wrapping end part 31 of coil 30 to the protruding coil terminal 15, coil 30 and coil terminal 15 are connected to each other electrically and mechanically. A second end of coil terminal 15 protrudes through penetration-hole 132 to the right side of substrate support portion 13. A protruding region of coil terminal 15 forms connection terminal 151 to be inserted into through-hole 73 of circuit board 70.

Substrate support portion 13 has projections 133 on the right side surface (a surface to which circuit board 70 is to be disposed) of substrate support portion 13 at the upper and lower parts in the vertical direction. Projections 133 are brought into contact with the rear surface (the left side surface in FIG. 2) of circuit board 70 (see FIGS. 1 and 2).

Furthermore, substrate support portion 13 has bosses 134 on the right side surface of substrate support portion 13 in the middle in the vertical direction. Bosses 134 are brought into contact with the rear surface of circuit board 70. Each of the tips of bosses 134 is provided with columnar projection 135 to be inserted into recess 71 provided in the side edge of circuit board 70.

Cap support portion 14 is formed unitarily with substrate support portion 13 on the lower part of substrate support portion 13. Cap support portion 14 includes disk-shaped brim portion 141 and circular-cylinder portion 142. Brim portion 141 is linked to the lower part of substrate support portion 13. Circular-cylinder portion 142 is provided on the lower surface of brim portion 141.

Coil bobbin 20 is formed unitarily with circular-cylinder portion 142 on the lower part of circular-cylinder portion 142. Coil bobbin 20 includes winding drum portion 21 and flange portion 22. Winding drum portion 21 has a circular-cylindrical shape, and protrudes downward from the lower surface of circular-cylinder portion 142. Flange portion 22 protrudes from the lower end part of winding drum portion 21 in the diameter direction of winding drum portion 21. Coil 30 is wound around winding drum portion 21 located between circular-cylinder portion 142 and flange portion 22. Round hole 23 is formed in the center of the lower surface of flange portion 22. Round hole 23 is formed from the lower surface of flange portion 22 to circular-cylinder portion 142. Core 24, having a columnar shape and formed of magnetic material such as ferrite, is inserted into round hole 23.

Cap 40 is, for example, a molded product of insulating and non-magnetic synthetic resin. As shown in FIGS. 1 to 5, cap 40 is cylindrical and has a bottom. Cap 40 includes circular-cylindrical cylinder portion 41 and bottom part 42. Bottom part 42 closes one end of cylinder portion 41. Cylinder portion 41 has, on the entire circumference of the outer peripheral surface thereof, groove 43 into which sealing member 80 is to be fitted. Cylinder portion 41 has, on the outer peripheral surface thereof, tapered portion 44 whose outer diameter gradually decreases toward bottom part 42 of cap 40 from an edge part of groove 43. Furthermore, the inner diameter of cylinder portion 41 is set to a slightly larger dimension than the outer diameter of circular-cylinder portion 142 of body 10.

Housing 50 is formed of metallic material such as S45C. As shown in FIGS. 1 to 5, housing 50 includes hexagonal prism portion 51, circular-cylinder portion 52, and covering portion 53. Circular-cylinder portion 52 is provided unitarily with hexagonal prism portion 51 at the lower part of hexagonal prism portion 51. Covering portion 53 has a circular-cylindrical shape protruding upward from the upper surface of hexagonal prism portion 51.

Housing 50 is hollow and circular-cylindrical. A part of body 10 (for example, substrate support portion 13) is to be inserted into hollow portion 54 of housing 50. Note here that in a state in which body 10 is attached to housing 50, coil bobbin 20 and circular-cylinder portion 142 protrude to the outside from opening 63 in lower part of housing 50, and connector portion 12 protrudes to the outside from an opening in the upper part of housing 50.

Figure 8:
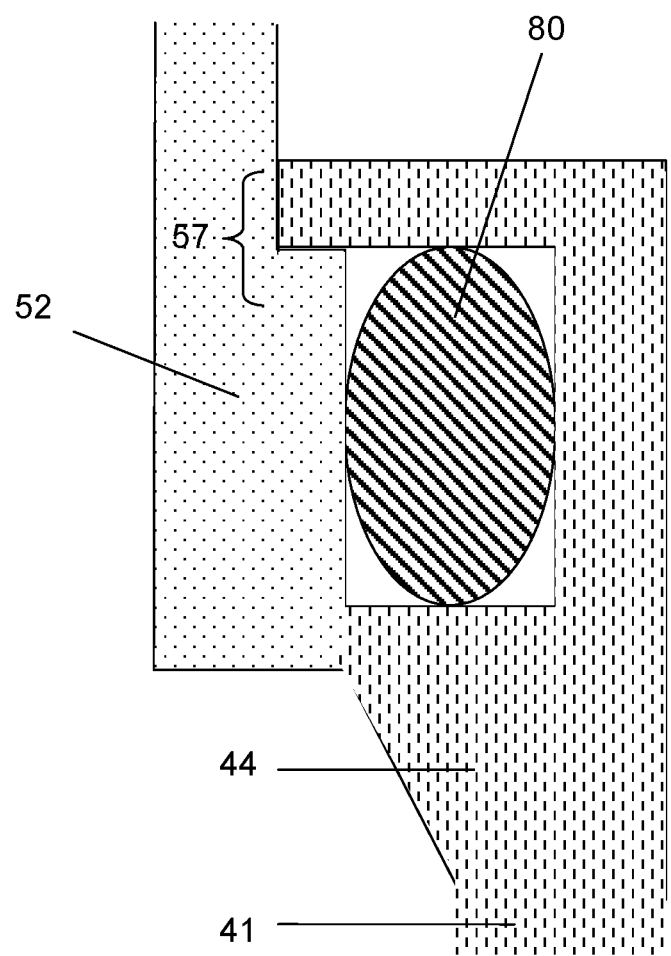
FIG. 8 is a sectional schematic view of a step-difference portion in accordance with the exemplary embodiment proximity sensor.

When the assembly has been completed, step-difference portion 57 is provided in the upper side of a contact region (smaller-diameter part 55) in which sealing member 80 is brought into contact with the inner side surface of hollow portion 54 of housing 50 (see FIGS. 2 and 8). In the inner side surface of hollow portion 54, the inner diameter D1 (a first inner diameter) of smaller-diameter part 55 is somewhat smaller than the inner diameter D2 (a second inner diameter)

of a region (larger-diameter part 56) located above step-difference portion 57 (see FIG. 2).

Furthermore, hexagonal prism portion 51 has, on the upper surface thereof, circular recess 58 into which flange portion 11 of body 10 is to be inserted (see FIG. 2). Stepped part 59 having a width somewhat smaller than the diameter of O-ring 81 is formed between the end surface of recess 58 and the inner surface of covering portion 53. Stepped part 59 defines air-gap 60 between the outer peripheral surface of flange portion 11 and the inner surface of covering portion 53. Then, O-ring 81 is disposed in air-gap 60. Hollow portion 54 of housing 50 is opened in the bottom part of recess 58. The inner side surface of hollow portion 54 has tapered portion 61 whose inner diameter gradually decreases toward the lower part from the upper part (a bottom part side of recess 58).

Figure 5:
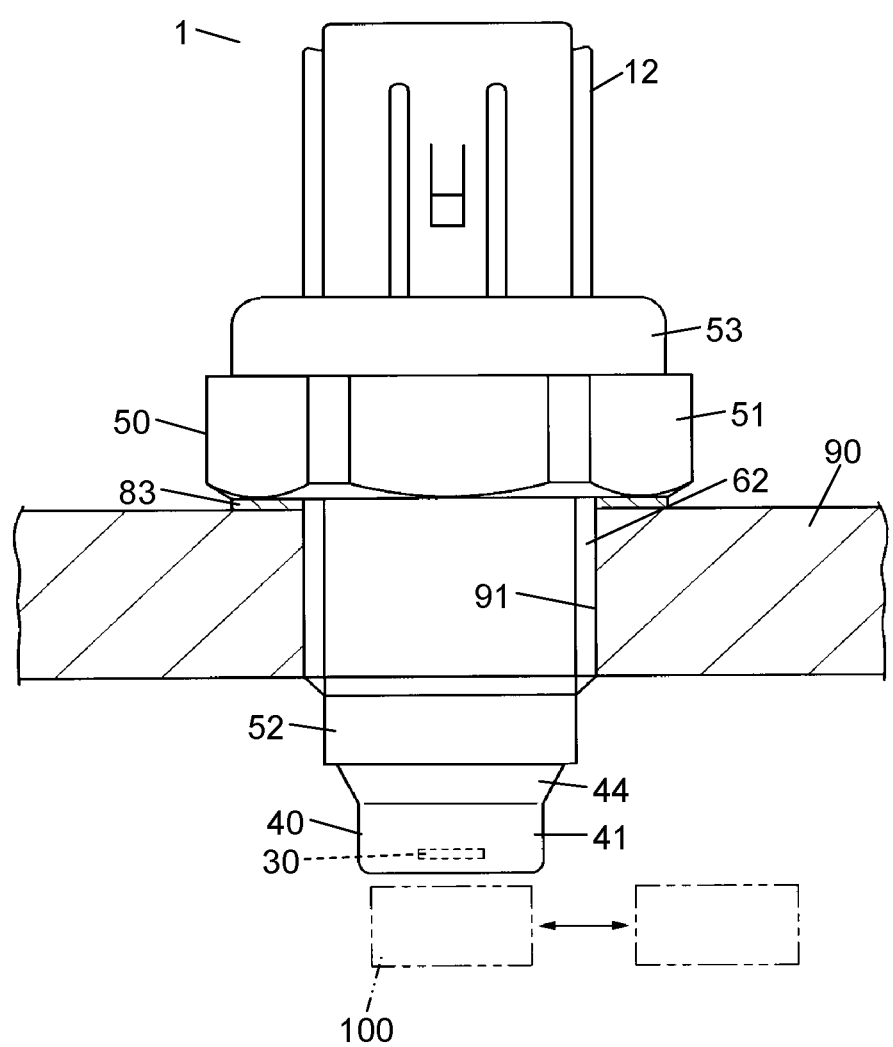
FIG. 5 is a view of a used state of the proximity sensor in accordance with the exemplary embodiment.

Furthermore, male screw portion 62 is formed on the outer peripheral surface of circular-cylinder portion 52. As shown in FIG. 5, male screw portion 62 is screwed into screw hole 91 provided in transmission case 90 as an object to be fixed. In a case where proximity sensor 1 is attached to transmission case 90, washer 83 is attached to male screw portion 62 to prevent loosening. Washer 83 is disposed between hexagonal prism portion 51 of housing 50 and transmission case 90.

Circuit board 70 is a rectangular plate-shaped circuit board (for example, a printed wiring board) (see FIGS. 1, 2, 6, and 7). Circuit components constituting a sensing circuit are mounted on circuit board 70. Circuit board 70 has three through-holes 72 and two through-holes 73. Three connection terminals 122 are to be inserted into three through-holes 72, respectively. Two connection terminals 151 are to be inserted into two through-holes 73, respectively. Projections 135 are to be inserted into recesses 71, and connection terminals 122 and 151 are inserted into the corresponding through-holes 72 and 73, respectively. In such a state, circuit board 70 is disposed to substrate support portion 13 in such a manner that the rear surface of circuit board 70 is brought into contact with projections 133 and bosses 134. Then, connection terminals 122 and 151, which have been inserted into through-holes 72 and 73, are subjected to soldering. Thus, connection terminals 122 and 151 are electrically connected to the sensing circuit formed on circuit board 70, and circuit board 70 is fixed to substrate support portion 13.

Figure 6:
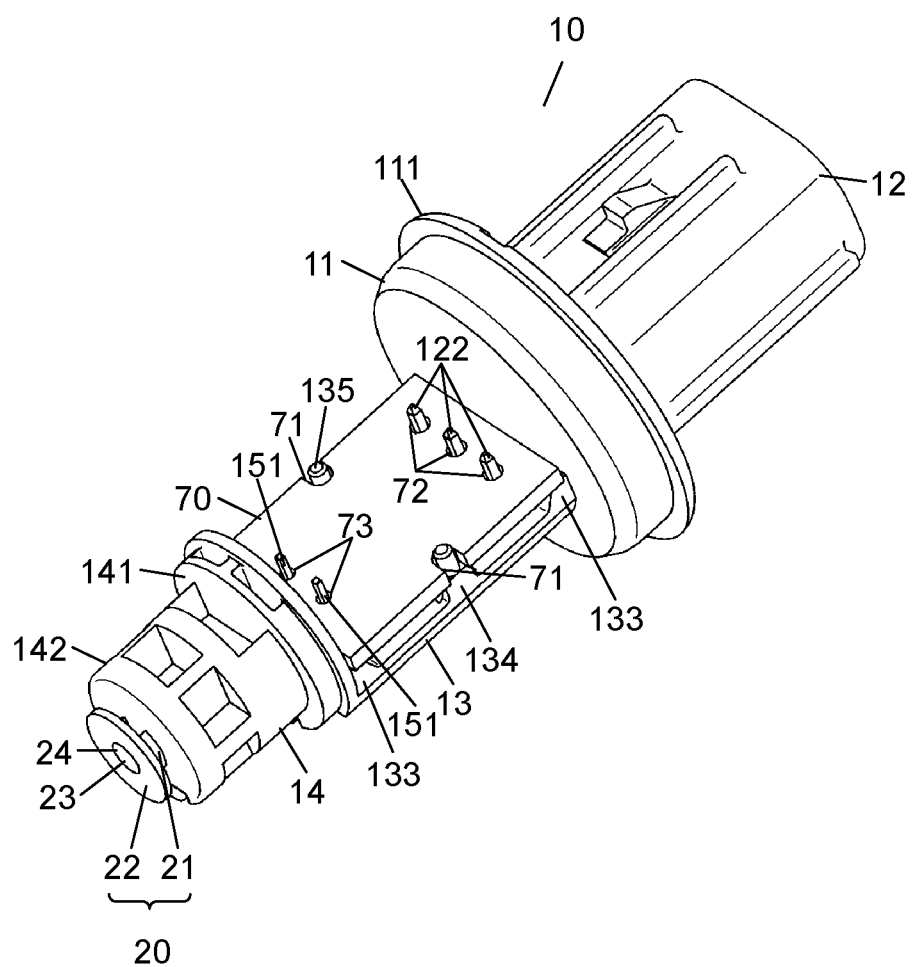
FIG. 6 is an external perspective view of a body of the proximity sensor in accordance with the exemplary embodiment.
Figure 7:
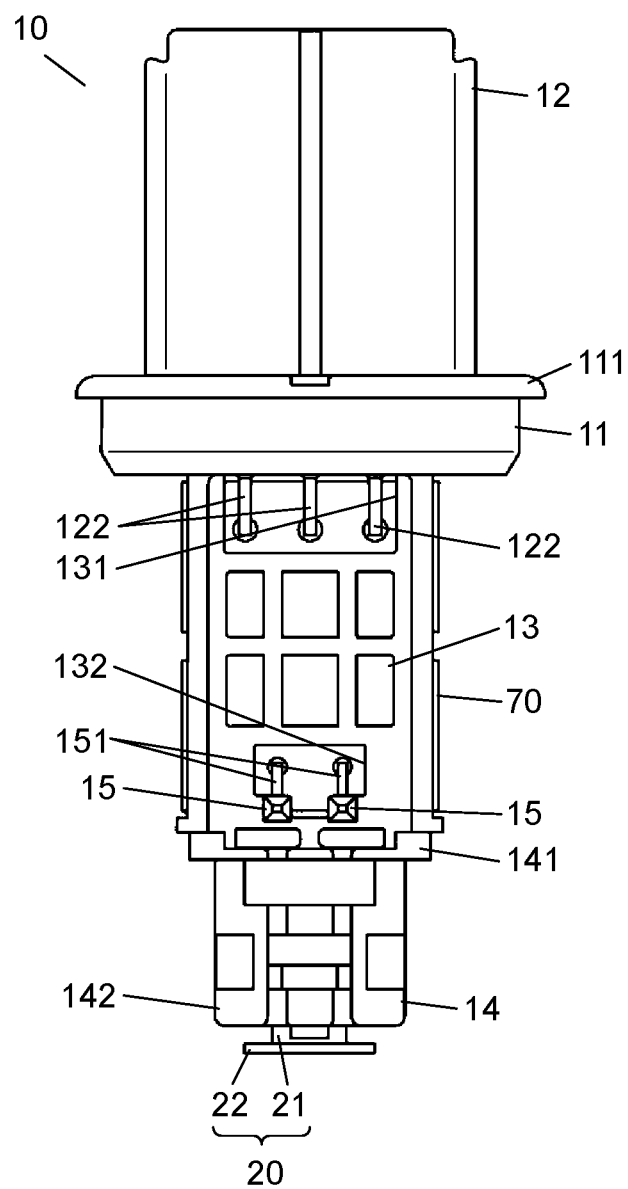
FIG. 7 is a side view of the body of the proximity sensor in accordance with the exemplary embodiment.

The sensing circuit formed on circuit board 70 converts electric power supplied from an external power source via connection terminal 122 into high-frequency electric power, and supplies coil 30 with the high-frequency electric power via connection terminal 151. The sensing circuit supplies coil 30 with the high-frequency electric power, and thereby a high-frequency magnetic field is generated around coil 30. As shown in FIG. 5, when object 100 made of metallic material, magnetic material, or the like, approaches coil 30 in a state in which a high-frequency magnetic field is generated around coil 30, conductance of coil 30 is changed. As a result, voltage or electric current applied to coil 30 is changed. The sensing circuit detects the changed amount of the voltage or electric current applied to coil 30 in a state in which coil 30 is supplied with high-frequency electric power. When the changed amount exceeds a threshold, the sensing circuit outputs a sense signal, indicating that object 100 is sensed, from connection terminal 122 to the external circuit. That is to say, the sensing circuit formed on circuit board 70 allows sensing of the presence or absence of object 100 in a sensing area in the vicinity of coil 30 (an area in which coil 30 generates a high-frequency magnetic field). In FIGS. 2 and 6, components mounted on circuit board 70 are not shown.

Proximity sensor 1 of this exemplary embodiment is assembled as follows. Firstly, projections 135 are inserted into recesses 71 of circuit board 70, and corresponding connection terminals 122 and 151 are inserted into through-holes 72 and 73, respectively. Then, circuit board 70 is disposed to substrate support portion 13 in a state in which projections 133 and bosses 134 of substrate support portion 13 are in contact with the surface of circuit board 70. In this state, connection terminals 122 and 151 are fixed to through-holes 72 and 73 by soldering, respectively. Thus, circuit board 70 is fixed to body 10, and connection terminals 122 and 151 are electrically connected to the circuit of circuit board 70. Furthermore, coil 30 is wound onto coil bobbin 20, and, thereafter, end parts 31 on the both sides of coil 30 are wrapped to corresponding coil terminals 15, respectively. Thus, coil 30 is electrically connected to coil terminal 15. Note here that silicone potting material 17 may be applied to a region in which end parts 31 are wound onto coil terminal 15. Thus, even in an environment undergoing vibration, end parts 31 are not easily disconnected (see FIG. 2).

Cylinder portion 41 of cap 40 is inserted into sealing member 80 from the side of bottom part 42. Then, sealing member 80 is moved along tapered portion 44 toward groove 43 while sealing member 80 is extended, and sealing member 80 is fitted into groove 43. Cylinder portion 41 has tapered portion 44 on the outer peripheral surface thereof. When sealing member 80 is moved to groove 43 along tapered portion 44, sealing member 80 is gradually extended and then inserted into groove 43. That is to say, formation of tapered portion 44 facilitates fitting of sealing member 80 into groove 43.

Next, silicone-based adhesive agent 16 is applied to the inner side of bottom part 42 of cap 40, and circular-cylinder portion 142 of body 10 is inserted into the inside of cap 40 with coil bobbin 20 inserted first. At this time, the inner peripheral surface of cylinder portion 41 of cap 40 is brought into contact with the outer peripheral surface of circular-cylinder portion 142 of body 10, and thereby, cap 40 is positioned with respect to body 10 in a plane perpendicular to the axial direction of circular-cylinder portion 142 (the vertical direction in this exemplary embodiment). Then, body 10 is inserted into cap 40 until flange portion 22 of coil bobbin 20 comes into contact with the inner side of bottom part 42. Thus, adhesive agent 16, which has been applied to a contact region with flange portion 22, in the inner side of bottom part 42 is pushed to the outer side by flange portion 22. Body 10 and cap 40 are configured such that body 10 and the inside of bottom part 42 of cap 40 define gap 18 in a state in which coil bobbin 20 is brought into contact with the inside of bottom part 42 of cap 40. Consequently, adhesive agent 16 pushed out by flange portion 22 moves to gap 18. Body 10 can be inserted into the inside of cap 40 to the position in which flange portion 22 comes into contact with the inner side of bottom part 42.

Then, when adhesive agent 16 is solidified in a state in which coil bobbin 20 is inserted into cap 40, cap 40 is fixed to body 10. In proximity sensor 1 of this exemplary embodiment, a use amount of adhesive agent 16 is managed such that air-gap 19 is defined between adhesive agent 16 and coil 30 in a state in which adhesive agent 16 is solidified as shown in FIG. 2. Therefore, even when adhesive agent 16 is thermally expanded, adhesive agent 16 is prevented from coming into contact with coil 30 and being deformed. Consequently, sensing property of proximity sensor 1 is not easily changed due to deformation of coil 30. Note here that the inner peripheral surface of cylinder portion 41 of cap 40 is brought into contact with at least a part of the outer peripheral surface of circular-cylinder portion 142 of body 10, and thereby cap 40 is positioned with respect to body 10 in a plane perpendicular to the axial direction of circular-cylinder portion 142. Furthermore, when flange portion 22 is brought into contact with the inner side of bottom part 42 of cap 40, cap 40 is positioned with respect to body 10 in the vertical direction.

Next, O-ring 81 is inserted from the upper side into the inner side of covering portion 53 of housing 50. Then, body 10 to which cap 40 is fixed is inserted with cap 40 inserted first from the upper side into hollow portion 54 of housing 50. When body 10 is inserted into hollow portion 54 of housing 50 until flange portion 11 is brought into contact with the bottom surface of recess 58, cap 40 protrudes outwards from opening 63 of the lower part of housing 50. At this time, O-ring 81 is disposed in air-gap 60 surrounded by hexagonal prism portion 51 and covering portion 53 of housing 50, the peripheral surface and brim portion 111 of flange portion 11. In this state, a region of covering portion 53 protruding upward from the upper surface of flange portion 11 is bent inward so as to press the upper surface of flange portion 11 from the upper side. Thus, body 10 is fixed to housing 50. As mentioned above, an assembly operation is completed.

By bending covering portion 53 so as to press the upper surface of flange portion 11, O-ring 81 is compressed and deformed. Thus, the gap defined between flange portion 11 of body 10 and housing 50 is closed by O-ring 81 (see FIG. 2). Furthermore, sealing member 80 fitted into groove 43 of cap 40 is brought into contact with smaller-diameter part 55 provided in circular-cylinder portion 52 of housing 50. Smaller-diameter part 55 has an inner diameter somewhat smaller than the inner diameter of larger-diameter part 56 located at the upper side from smaller-diameter part 55. Consequently, sealing member 80 is more compressed and is deformed, so that the gap defined between the inner surface of circular-cylinder portion 52 of housing 50 and cap 40 is more reliably closed.

Next, an operation of proximity sensor 1 of this exemplary embodiment is described. When a plug of an external circuit is connected to connector portion 12 in a state in which proximity sensor 1 is attached to transmission case 90 as shown in FIG. 5, electric power is supplied to a sensing circuit formed on circuit board 70. The sensing circuit formed on circuit board 70 converts electric power supplied from an external power source via connection terminal 122 into high-frequency electric power, and supplies coil 30 with the high-frequency electric power. Then, coil 30 generates high-frequency magnetic field. Herein, when object 100 made of metallic material, magnetic material, or the like, approaches coil 30, conductance of coil 30 is changed, so that voltage or electric current applied to coil 30 is changed. The sensing circuit formed on circuit board 70 senses the change of voltage or electric current applied to coil 30. When the changed amount exceeds a threshold, the sensing circuit outputs a sense signal indicating that the object 100 is sensed to the external circuit via connection terminal 122. On the other hand, when object 100 moves to the outside of the sensing area of proximity sensor 1, the voltage or electric current applied to coil 30 shows a value of a case where object 100 is not sensed. Then, the sensing circuit outputs a sense signal indicating that object 100 is not sensed. Consequently, proximity sensor 1 of this exemplary embodiment can sense presence of object 100 made of metallic material, magnetic material, or the like, in a non-contact manner. Proximity sensor 1 of this exemplary embodiment is used for sensing, for example, whether a manual transmission of an automobile is switched to neutral. When the manual transmission is switched to neutral, proximity sensor 1 outputs a sense signal indicating that object 100 is sensed to the external circuit. The external circuit such as ECU (Electronic Control Unit) uses a sensed result output by proximity sensor 1 for controlling start-up of engine, and the like. The external circuit permits starting of engine in a case where a sense signal indicating that object 100 is sensed is input from proximity sensor 1 (that is to say, when the manual transmission is switched to neutral).

As mentioned above, in this exemplary embodiment, body 10 is attached to housing 50 in a state in which coil bobbin 20 is allowed to protrude outward from opening 63 at the end part of circular-cylinder portion 52 of housing 50, and sealing member 80 (O-ring) is brought into contact with the outer peripheral surface of cap 40 and the inner peripheral surface of circular-cylinder portion 52.

That is to say, when cap 40 is inserted into circular-cylinder portion 52 in a state in which sealing member 80 is interposed between circular-cylinder portion 52 and cap 40, sealing member 80 is brought into contact with the inner side surface of circular-cylinder portion 52 and the outer side surface of cap 40. As a result, cap 40 is positioned with respect to housing 50 in a plane perpendicular to the axial direction of circular-cylinder portion 52. Therefore, coil bobbin 20 of body 10 fixed to cap 40 can be positioned with respect to housing 50 fixed to an object to be fixed. Consequently, the workability in assembly is improved while the positioning accuracy of coil bobbin 20 is enhanced.

Furthermore, a gap between circular-cylinder portion 52 of housing 50 and cap 40 is closed with a sealing member. Consequently, foreign matter does not easily enter the inside of housing 50. In particular, in a case where housing 50 is attached to transmission case 90, foreign matter such as oil, water, dust, and metal powder may be attached to cap 40. However, in this exemplary embodiment, such foreign matter does not easily enter the inside of housing 50.

Furthermore, coil bobbin 20 and cap 40 may be bonded to each other with adhesive agent 16.

When coil bobbin 20 and cap 40 are bonded to each other with adhesive agent 16, it is not necessary to provide a structure for mechanically bonding coil bobbin 20 and cap 40 to each other. Consequently, an operation for fixing coil bobbin 20 and cap 40 to each other is facilitated. However, coil bobbin 20 and cap 40 may be provided with a structure for mechanically bonding coil bobbin 20 and cap 40.

Furthermore, body 10 of this exemplary embodiment is configured such that coil bobbin 20 and the inner side surface of cap 40 define gap 18, which adhesive agent 16 enters, in a state in which coil bobbin 20 is inserted into the inside of cap 40 and brought into contact with the bottom part of cap 40.

Thus, when coil bobbin 20 is inserted into the inside of cap 40 and is brought into contact with the inner side of bottom part 42, adhesive agent 16 applied to the inner side of bottom part 42 enters gap 18. Consequently, coil bobbin 20 and cap 40 can be fixed to each other in a state in which coil bobbin 20 is brought into contact with the inner side of bottom part 42. Note here that in a state in which coil bobbin 20 is in contact with the inner side of bottom part 42 of cap 40, adhesive agent 16 having a film thickness of about 30 μm may remain between coil bobbin 20 and the inner side of bottom part 42. However, it is more desirable that coil bobbin 20 and the inner side of bottom part 42 be brought into direct contact with each other. The above-mentioned configuration keeps a distance between coil bobbin 20 and the inner side of bottom part 42 constant, and improves the sensing accuracy for sensing object 100.

Furthermore, in this exemplary embodiment, adhesive agent 16 bonds coil bobbin 20 and cap 40 to each other such that air-gap 19 is defined between adhesive agent 16 and coil 30.

Thus, even when adhesive agent 16 is thermally expanded, adhesive agent 16 does not easily come in contact with coil 30, change of sensing performance due to deformation of coil 30 does not easily occur.

Furthermore, in this exemplary embodiment, cap 40 has, on the outer peripheral surface thereof, groove 43 into which sealing member 80 (O-ring) is fitted. Cap 40 has, on a part of the outer peripheral surface thereof, tapered portion 44 in which the outer diameter of cap 40 gradually decreases toward bottom part 42 from the edge part of groove 43.

Thus, when sealing member 80 is inserted from the side of bottom part 42 of cap 40 and moved to groove 43 along tapered portion 44, the sealing member enters groove 43 while it is gradually extended. Thus, an attaching operation of the sealing member is facilitated.

Furthermore, the inner side surface (inner peripheral surface) of circular-cylinder portion 52 is provided with step-difference portion 57. Thus, when the assembly has been completed, the inner diameter D1 (first inner diameter) of a contact region (smaller-diameter part 55) with which sealing member 80 is brought into contact is smaller than the inner diameter D2 (second inner diameter) of a region (larger-diameter part 56) opposite to opening 63 with respect to the contact region.

Since sealing member 80 is brought into contact with larger-diameter part 56 during the course of inserting body 10 into housing 50, the deformation amount of sealing member 80 is smaller and body 10 can be inserted into housing 50 with smaller force as compared with the case where sealing member 80 is brought into contact with smaller-diameter part 55. Furthermore, when the assembly has been completed, the sealing member is brought into contact with smaller-diameter part 55. Therefore, as compared with the case where sealing member 80 is brought into contact with larger-diameter part 56, the deformation amount of sealing member 80 becomes larger, and the gap between housing 50 and cap 40 can be closed more reliably.

Proximity sensor 1 of this exemplary embodiment includes an O-ring having a circular-cross sectional shape as a ring-shaped sealing member 80, however ring-shaped sealing member 80 is not limited to an O-ring. Sealing member 80 may be any other members obtained by molding elastic material such as fluorine rubber and nitrile rubber into a ring shape. Examples thereof include an X-ring having an X-shaped cross-section, a V-ring having a V-shaped cross-section, and the like. Furthermore, proximity sensor 1 of this exemplary embodiment has sealing member 80 formed of a fluorine rubber having excellent heat-resisting property, however material for the sealing member can be appropriately changed depending on use environment.

In this exemplary embodiment, cap 40 has, on the outer peripheral surface thereof, groove 43 into which sealing member 80 is fitted. However, circular-cylinder portion 52 of housing 50 may have groove into which sealing member 80 is fitted. Furthermore, in this exemplary embodiment, O-ring 81 is held between the upper surface of hexagonal prism portion 51 of housing 50 and brim portion 111 provided on flange portion 11 in body 10. Sealing member 80 may be held by the same structure as this. That is to say, instead of providing groove 43 of cap 40, sealing member 80 may be sandwiched between an outer brim provided on the upper end of cap 40 and an inner brim provided on the lower end part of circular-cylinder portion 52.

Furthermore, in this exemplary embodiment, core 24 may be molded unitarily with coil bobbin 20. This makes it possible to omit work of putting core 24 into coil bobbin 20. Thus, assembly is facilitated. In addition, accuracy of the position to which core 24 is fixed is improved, and therefore detection accuracy is improved.

According to this disclosure, a ring-shaped sealing member is interposed between a circular-cylinder portion of a housing and a cap, and the sealing member is brought into contact with the inner side surface of the circular-cylinder portion and the outer side surface of the cap. Consequently, the cap is positioned with respect to the housing in a plane perpendicular to the axial direction of the circular-cylinder portion. That is to say, the cap is positioned with respect to the housing only by inserting the circular-cylinder portion into the cap in a state in which a sealing member is interposed between the circular-cylinder portion of the housing and the cap. As a result, the coil bobbin of the body fixed to the cap can be positioned to the housing. Thus, the proximity sensor of this disclosure has an effect of improving the workability of an assembly operation.

What is claimed is:

1. A proximity sensor comprising:
   a body including a coil bobbin at a first end;
   a coil wound around a winding drum portion of the coil bobbin;
   a cap being cylindrical and having a bottom, to be placed to the body so as to cover the coil bobbin;
   a hollow housing which includes, at a first end, a circular-cylinder portion having an opening, and is to be placed to the body in such a manner that the cap protrudes from the opening; and
   a ring-shaped sealing member disposed between an outer peripheral surface of the cap and an inner peripheral surface of the circular-cylinder portion of the housing,
   wherein the coil bobbin includes a flange portion at a lower end part of the winding drum portion,
   an adhesive agent, which is formed at a gap between the coil bobbin and an inner peripheral surface of the cap, bonds the coil bobbin and the cap, and
   the adhesive agent and the coil faces each other via an air-gap at an upper part of the flange portion.

2. The proximity sensor of claim 1, wherein the flange portion of the coil bobbin is brought into contact with an inner side of a bottom part of the cap.

3. The proximity sensor of claim 2, wherein the flange portion of the coil bobbin and the inner side of the bottom part of the cap are bonded to each other with the adhesive agent.

4. The proximity sensor of claim 1, wherein the adhesive agent is formed at the gap which is an outside of an outer peripheral side of the flange portion.

5. The proximity sensor of claim 1, wherein the cap includes:
   a groove into which the sealing member is fitted, on the outer peripheral surface; and
   a tapered portion whose outer diameter gradually decreases toward a bottom part of the cap from an edge part of the groove.

6. The proximity sensor of claim 1, wherein the housing includes a groove into which the sealing member is fitted, on the inner peripheral surface of the circular-cylinder portion.

7. The proximity sensor of claim 1, wherein the housing includes a step-difference portion on the inner peripheral surface of the circular-cylinder portion
such that a first inner diameter of a contact portion, in which the sealing member is brought into contact with the inner peripheral surface of the circular-cylinder portion, is smaller than a second inner diameter of a region opposite to the opening with respect to the contact portion.

8. The proximity sensor of claim 1, wherein the sealing member is formed of elastic material.

9. The proximity sensor of claim 1, wherein the sealing member is an O-ring.

\* \* \* \* \*